March 23, 1965 G. L. HULT 3,174,523
FEMALE FASTENER COMPONENT FOR BOLT
Filed May 5, 1961
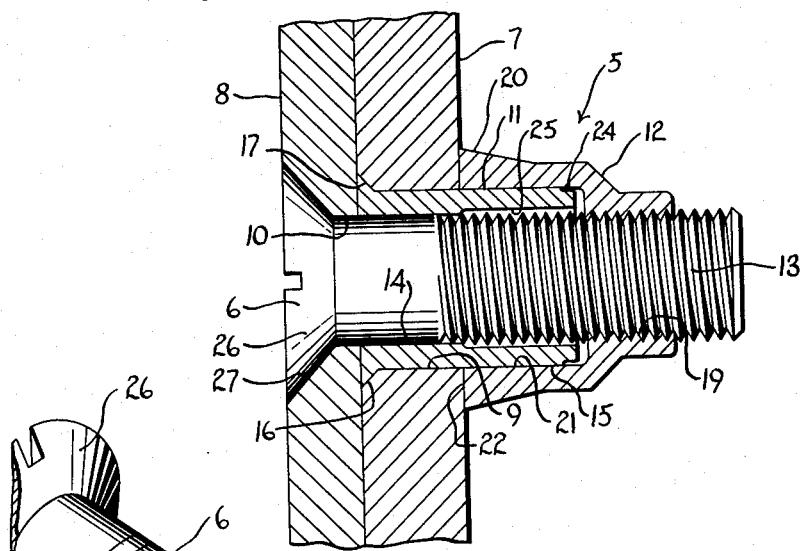
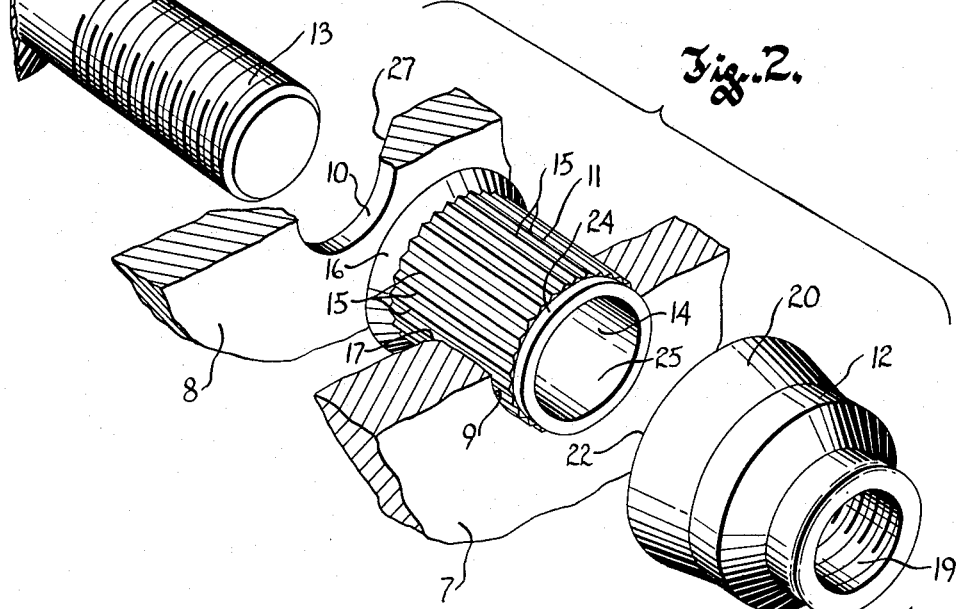
Gunnar Lennart Hult

United States Patent Office 3,174,523
Patented Mar. 23, 1965

3,174,523
FEMALE FASTENER COMPONENT FOR BOLT
Gunnar Lennart Hult, Linkoping, Sweden, assignor to Svenska Aeroplan Aktiebolaget, Linkoping, Sweden, a corporation of Sweden
Filed May 5, 1961, Ser. No. 108,008
3 Claims. (Cl. 151—41.7)

This invention relates to securement means of the class that comprises nuts and bolts, and refers more particularly to a female component for such securement means, adapted to be mounted on one of the two parts to be fastened together by a bolt extending through aligned holes in the parts, and which provides a nonrotatable threaded receptacle on said part in which the shank of the bolt is engageable.

It is a general object of this invention to provide a nut-like female component for securement means of the character described, which is light, inexpensive and dependable, and which is particularly well adapted for use in situations where an ordinary nut would be inaccessible or could not be readily held against rotation while a bolt is being inserted thereinto.

More specifically it is an object of this invention to provide a simple and inexpensive device, comprising only two members, which can be readily secured to a sheet metal or similar part, in a bolt receiving hole therein, to provide a threaded nut-like socket that resists both axial displacement and rotation relative to the part on which it is installed, and which is therefore well adapted to be disposed in an inaccessible location at the time a bolt is engaged therein.

It will be apparent from what has been said above that it is another object of this invention to provide an inexpensive fastening device of the character described which is particularly useful with sheet metal parts that are too thin to be provided with tapped holes, and which fastener has the same ability to absorb large thrust and shear loads as an ordinary nut and bolt securement, but allows a bolt to be used in situations where a part to be secured thereby would block access to the shank of the bolt so that a conventional nut could not be installed thereon.

Another specific object of this invention resides in the provision of means for holding a nut on the back of one of two parts which are to be secured together by a bolt extending through aligning holes in the two parts and threaded into the nut, which means comprises a sleeve adapted to be axially inserted into the hole in said one part, and an annular extension on the nut, which telescopes over the sleeve and is held by the latter against both axial and rotational displacement relative to said part.

With the above and other objects in view which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawing illustrates one complete example of the physical embodiment of the invention constructed according to the best mode so far devised for the practical application of the principles thereof, and in which:

FIGURE 1 is a vertical sectional view showing the female fastener component of this invention cooperating with a bolt to hold a pair of parts assembled; and FIGURE 2 is a disassembled perspective view of the female fastener component of this invention shown in relation to a bolt with which it cooperates and a pair of parts intended to be secured together by means of the bolt and the fastener.

Referring now more particularly to the accompanying drawing, the numeral 5 designates generally the female fastener component of this invention, which is adapted to cooperate with a headed bolt 6 in securing together a pair of parts 7 and 8 having aligned holes 9 and 10, respectively, through which the bolt extends. The female fastener component 5 comprises, in general, an inner telescoping member or sleeve 11 which is engageable in the bolt receiving hole 9 in the part 7, and an outer telescoping member or nut element 12 which the sleeve holds in place on the back of the part 7 and which thus provides, in effect, a threaded socket on said part in which the threaded shank 13 of the bolt 6 can be engaged.

It will be apparent that the parts 7 and 8 can be of a material, such as sheet metal, which is not suitable for tapping, and they may be so arranged in an assembly that a conventional nut that would normally cooperate with the bolt 6 would be inaccessible.

The inner telescoping member or sleeve 11 is tubular and has a length substantially greater than the thickness of the part 7, but it is substantially shorter than the bolt 6 with which the device cooperates. The bore 14 through the sleeve has a diameter large enough to allow the shank 13 of the bolt to pass freely therethrough.

The sleeve has an outside diameter of such size that it is quite snugly receivable in the bolt receiving hole 9 in the part 7, and its cylindrical outer surface is provided with friction means along its entire length, in this case shown as comprising sharp, lengthwise extending ribs or serrations 15. Hence upon axial insertion of the sleeve into the hole 9, the serrations 15 bite into the edge portion of the part around the hole to frictionally inhibit both rotation and axial motion of the sleeve relative to the part.

An enlarged head 16 on the sleeve, at its front end, provides a radially projecting, rearwardly facing circumferential shoulder which engages the front face of the part 7 to prevent axial displacement of the sleeve rearwardly out of the part. Preferably the head 16 is frusto-conical, tapering toward the rear end of the sleeve, so as to be receivable in a countersink 17 that opens to the front face of the part, thus allowing the sleeve to be inserted into the part far enough to have its front end exactly flush with the front face of the part, so that the sleeve does not interfere with flatwise engagement of the connected parts 7 and 8. Obviously the sleeve head 16 could instead project into a recess in the part 8, opening to its rear face and coaxial with the bolt hole 10; or, if desired, the axially opposite faces of the head could be in planes normal to the sleeve axis and the head could then serve as a spacer by which a predetermined separation was maintained between the parts.

The rear end portion 18 of the outer telescoping member 12 comprises a nut having a threaded bore 19 in which the threaded shank 13 of the bolt is adapted to be received. The front end portion 20 of the nut member has a forwardly opening counterbore 21, coaxial with the threaded bore 19, and thus comprises a cuff-like annular forward extension of the nut. The rear end portion of the sleeve which projects behind the part 7 telescopes into the cuff-like front end portion 20 of the nut member with a substantially snug fit, so that the serrations 15 on the sleeve bite into the inner surface of the nut member to frictionally inhibit both rotation and axial motion of the nut member relative to the sleeve.

The nut member can have a rounded external surface at its rear end, as shown, or can have any other desired external configuration. Preferably its front end portion 20 has a substantially large outside diameter and lies in a plane normal to its axis so that it provides a forwardly facing annular abutment 22 of substantial area by which a large compression force can be exerted against the rear face of the part 7 when the bolt 6 is tightened, without danger of deforming said part.

To facilitate installation of the nut member onto the sleeve, the latter preferably has a rounded circumferential relief or chamfer 24 at its rear end. The nut member is preferably telescoped onto the sleeve until the abutment 22 provided by the front end of the nut member firmly engages the rear face of the part 7.

Owing to the tight fit of the nut member over the rear end portion of the sleeve, there is a possibility that said portion of the sleeve may be slightly deformed or radially compressed when the nut member is installed thereon. The sleeve may therefore have a rearwardly opening counterbore 25 which insures free passage of the shank of the bolt through the sleeve, even though the sleeve may be thus deformed.

The bolt 6 can have a conical head 26, as shown, adapted to be received in a countersink 27 which opens to the front face of the part 8 and which is coaxial with the bolt hole 10 therein. Obviously, the bolt could be round or flat headed, and it could have either a straight or a shouldered shank, although in the latter case the sleeve bore 14 would naturally have to be sufficiently larger in diameter than the threaded bore 19 in the nut member to accommodate the shoulder on the bolt.

From the foregoing description taken together with the accompanying drawing it will be apparent that this invention provides a female fastener component which can be readily attached to one of a pair of sheet metal parts or the like which are intended to be secured together by means of a bolt extending through aligned holes in the parts, and which component provides, in effect, a threaded socket on the back of said one part, coaxial with the hole therein, which is adapted to receive the threaded shank of the bolt, and which is held against rotation by its connection with the part so that the bolt can be engaged in it from the front of the part without the necessity for access to anything behind the part.

What is claimed as my invention is:

1. Means providing a threaded receptacle adapted to be secured to one of two parts to be fastened together by a headed bolt extending through aligned holes in the parts and having the threaded end portion of its shank engaged in the receptacle, said means comprising: a sleeve having a bore of a diameter to freely slidably receive the shank of the bolt and having a length less than that of the bolt, so that the threaded end portion of the bolt projects beyond one end of the sleeve when the other end of the sleeve is near the head of the bolt, said sleeve having a radially projecting shoulder at its said other end which is engageable with the part to hold the sleeve against displacement in one axial direction relative to the part and the remainder of the sleeve having a uniform external shape and size along substantially its entire length so as to be adapted to pass snugly through a closely fitting hole in a part, and having serrations on its exterior surface, along substantially the full length thereof, which are adapted to bite into the part around the edge of the hole therein and prevent rotation of the sleeve relative to the part; a nut member having a threaded bore in one end portion thereof which is cooperable with the threaded end portion of a bolt shank and having a coaxial counterbore which opens to its other end, which is of uniform diameter along substantially its entire length and which is sized to snugly receive the first designated end portion of the sleeve, whereby the sleeve frictionally holds the nut member coaxially with a hole in a part in which the sleeve is received and secures the nut member against rotation and axial motion in said one direction relative to the part, said other end of the nut member providing an abutment engageable with the part to hold the nut member against displacement in the other axial direction.

2. A female fastening member adapted to be nonrotatably secured to a part, coaxially with a bolt receiving hole in the part, to provide a threaded socket on the part in which the shank of a bolt can be engaged, said fastening member comprising: a tubular cylindrical sleeve having an enlarged frustoconical head at one end thereof which tapers toward its other end, the remainder of said sleeve having a uniform external shape and size along substantially its entire length and having lengthwise extending serrations on its outer surface; and a nut member having a threaded bore adapted to receive the shank of a bolt which is axially slidable through the sleeve and having a coaxial counterbore opening to one end thereof which has a uniform inside diameter along its length such as to snugly receive the sleeve with the serrations on the sleeve frictionally engaging the inner surface defining the counterbore in the nut member to inhibit relative rotation and axial motion between the sleeve and the nut member, said end of the nut member providing an annular shoulder which axially faces the head on the sleeve when the sleeve and nut member are engaged.

3. In combination with one of two parts to be secured together by means of a bolt extending rearwardly through aligned bolt receiving holes in said parts, means providing a threaded receptacle on the rear of said one part, in which the bolt is engageable, said means comprising: a sleeve having a bore therethrough of a diameter to freely slidably receive a bolt, extending through the bolt receiving hole in said one part and having its rear end portion projecting axially beyond said part, said sleeve having an enlarged head at its front end which is seated in a forwardly opening countersink in said part, and having along substantially all of its outer surface except its head lengthwise extending serrations which are adapted to frictionally engage the edge of the bolt receiving hole in said one part, to inhibit rotation and axial motion of the sleeve relative to said part, the serrated portion of said sleeve being of uniform external shape and size along substantially its entire length; and a nut member having an annular sleeve engaging front portion with a uniform inside diameter along its length snugly telescoped over the projecting rear portion of the sleeve, with its front end engaging the rear face of said part, so as to be held by said serrations on the sleeve against rotation and axial displacement relative to said part, said nut member also having a rear portion with a coaxial threaded bore in which the threaded shank of a bolt passed through the sleeve from its front end is receivable.

References Cited in the file of this patent

UNITED STATES PATENTS

| | | |
|---|---|---|
| 1,432,243 | Harris | Oct. 17, 1922 |
| 2,409,352 | Gill | Oct. 15, 1946 |
| 2,700,172 | Rohe | Jan. 25, 1955 |
| 2,863,351 | Vaughn | Dec. 9, 1958 |
| 2,967,593 | Cushman | Jan. 10, 1961 |
| 3,020,947 | McKelvey | Feb. 13, 1962 |

FOREIGN PATENTS

| | | |
|---|---|---|
| 545,367 | Great Britain | May 21, 1942 |
| 600,962 | Great Britain | Apr. 23, 1948 |